Figure 1:
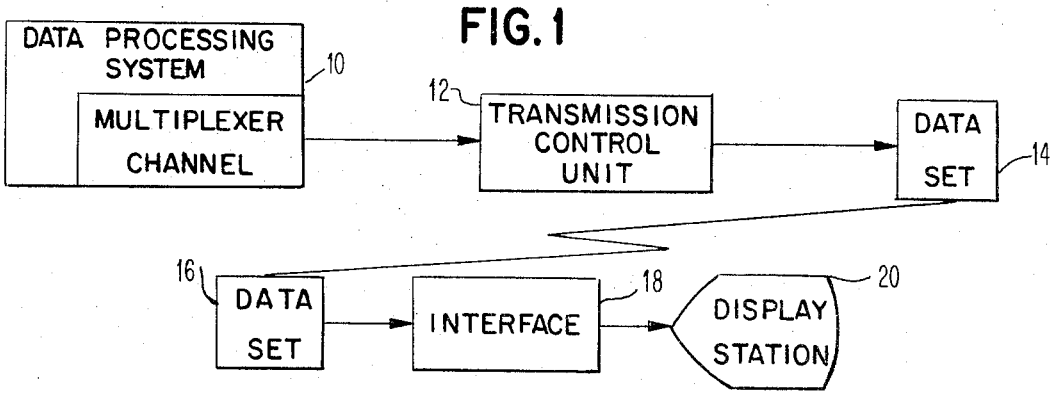
Figure 2:
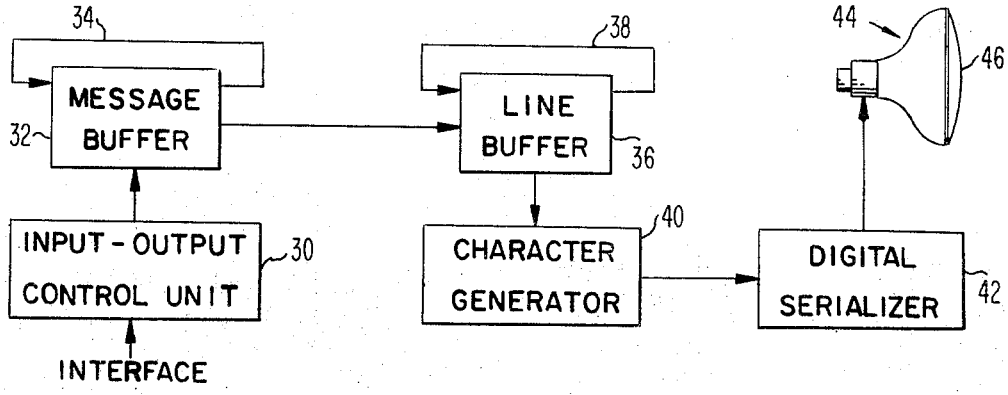
Figure 3:
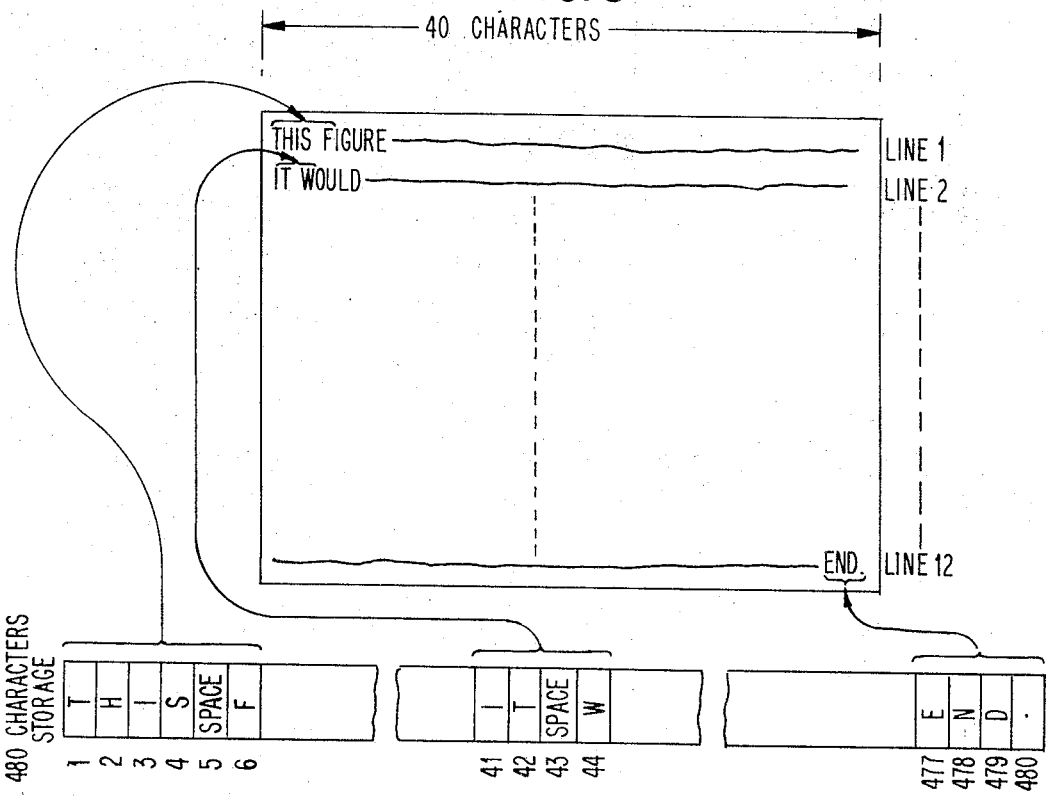
Figure 4:
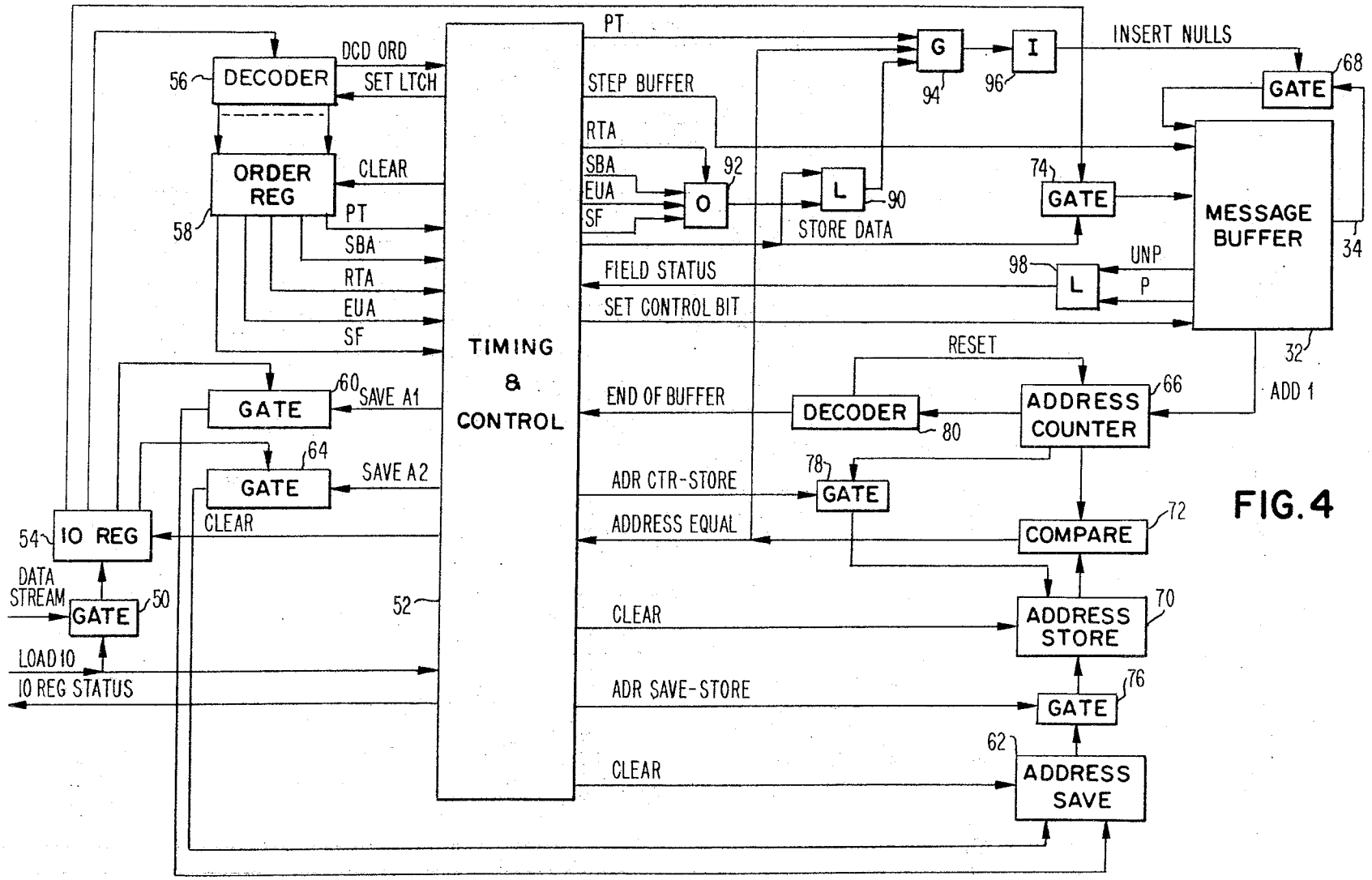
Figure 5:
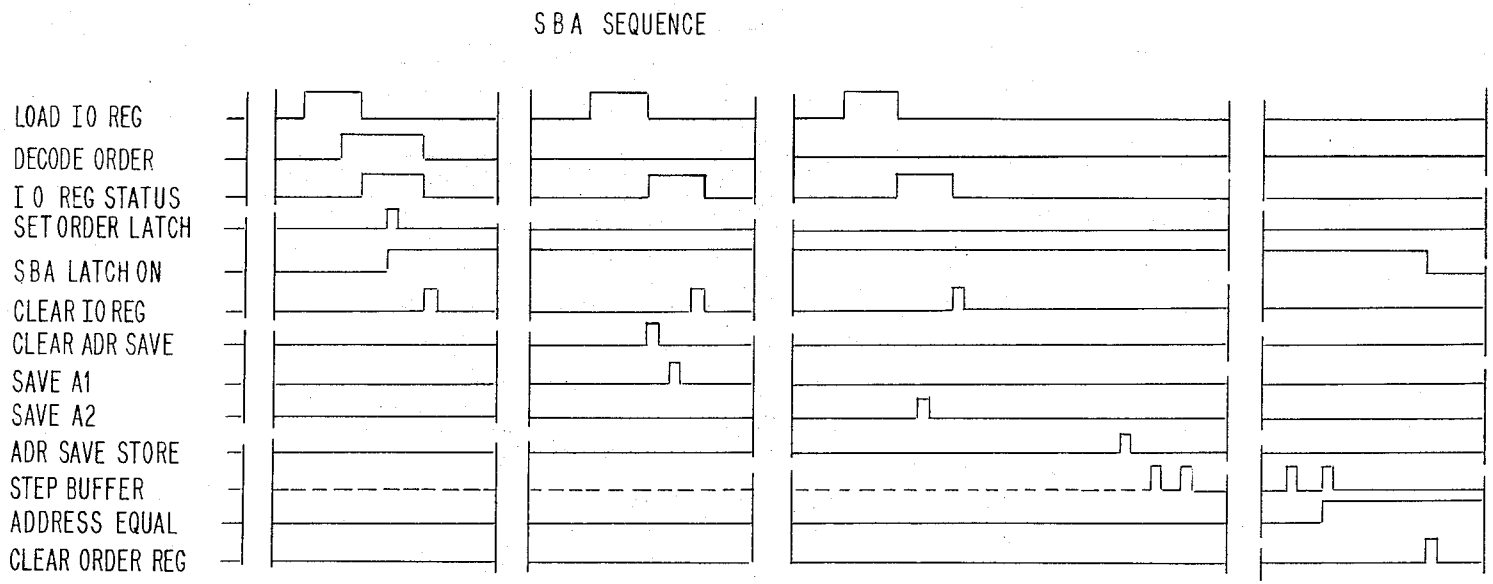
Figure 6:
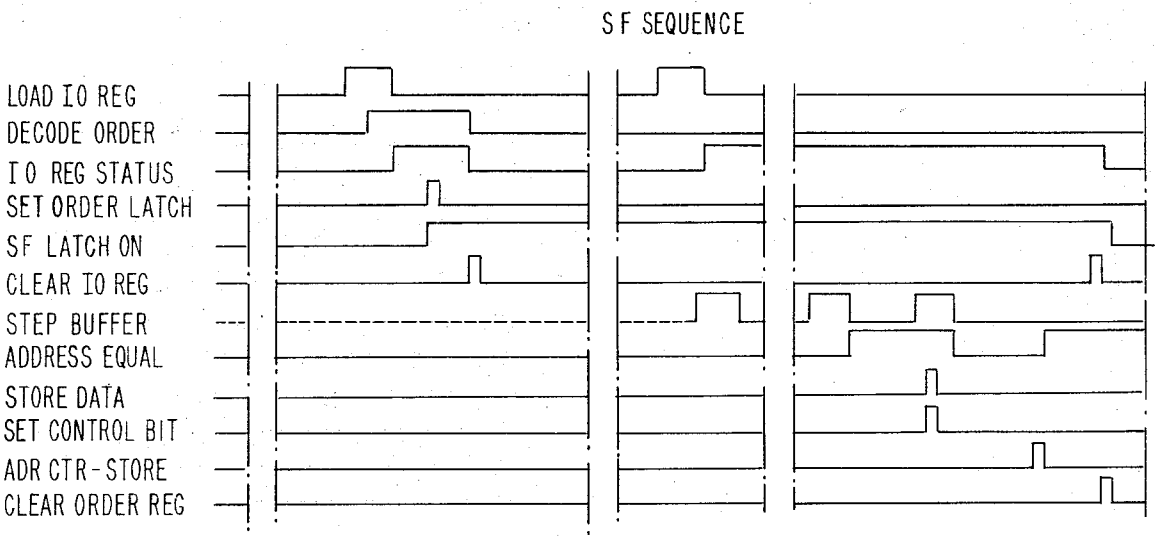
Figure 7:
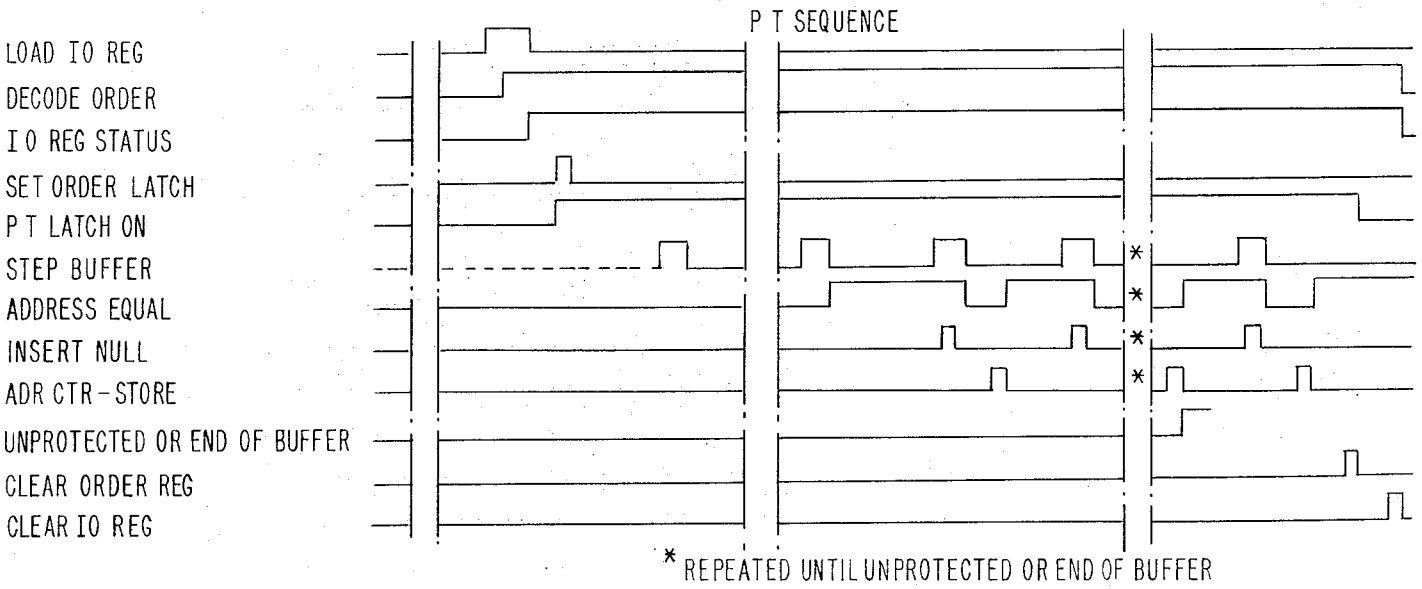
Figure 8:
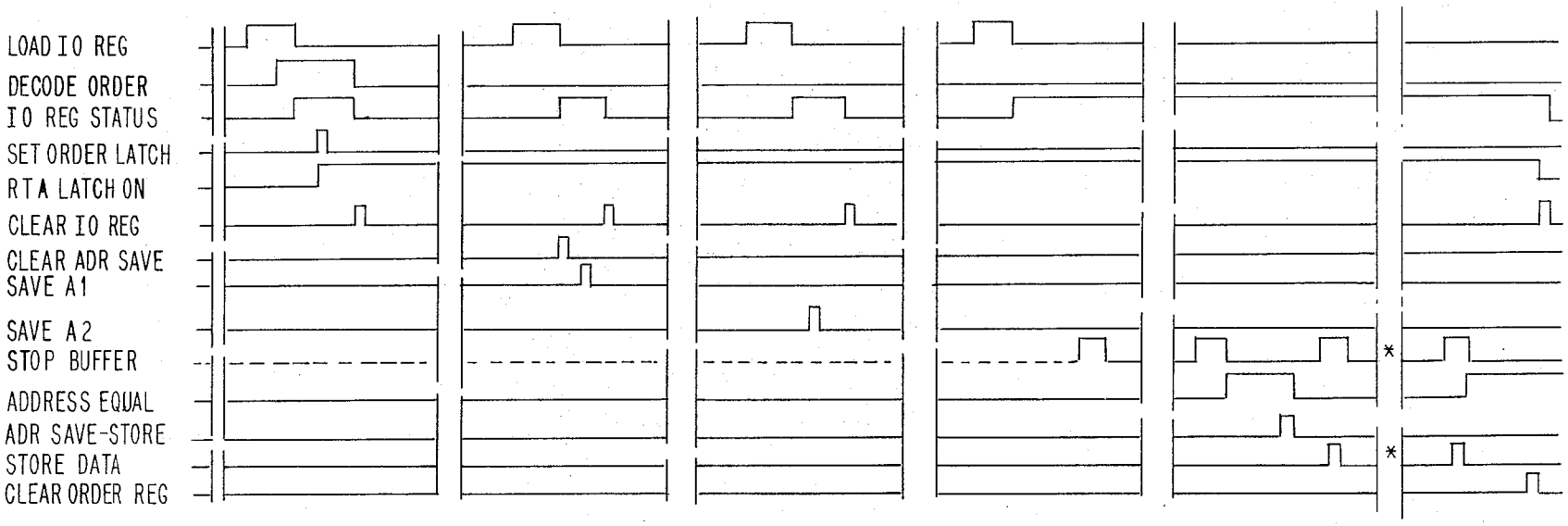
Figure 9:
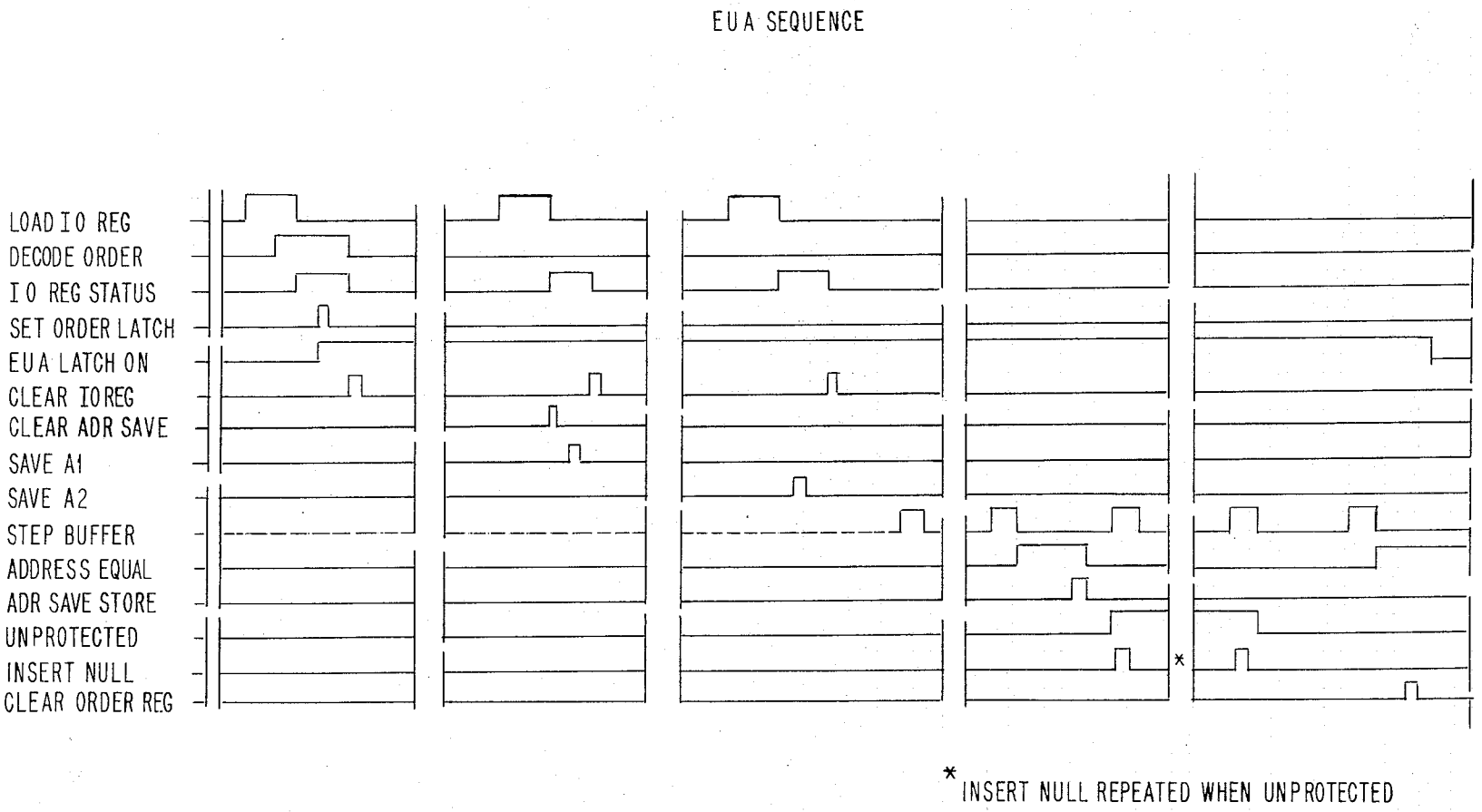
Figure 10:
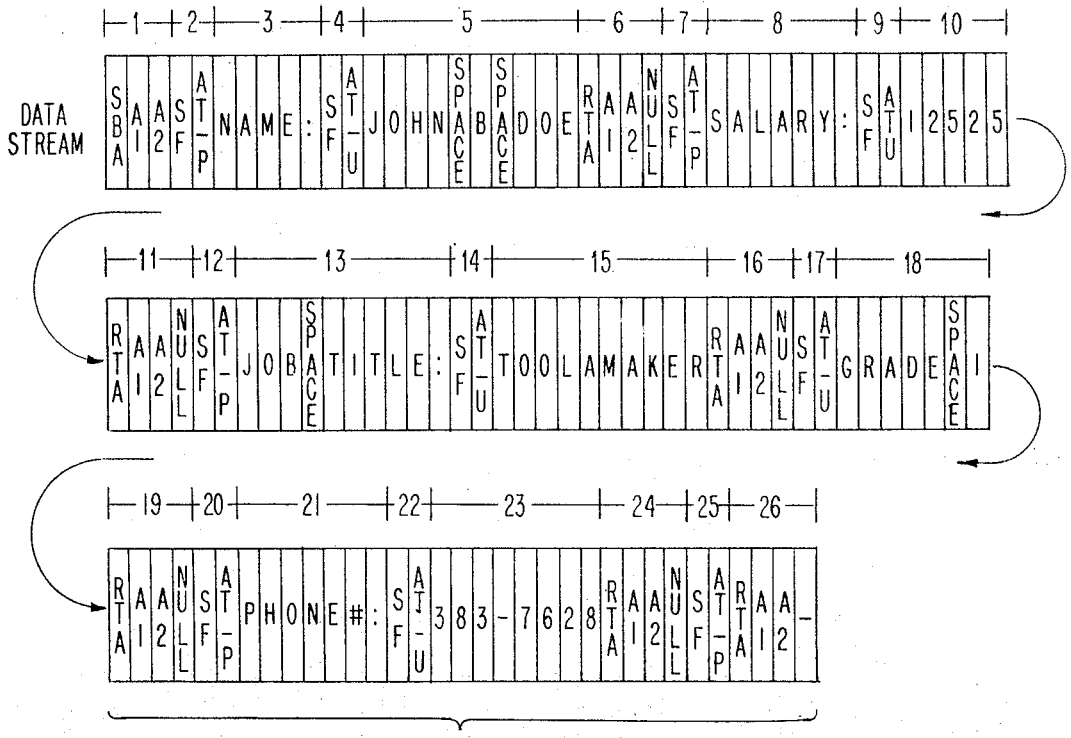
Figure 10:
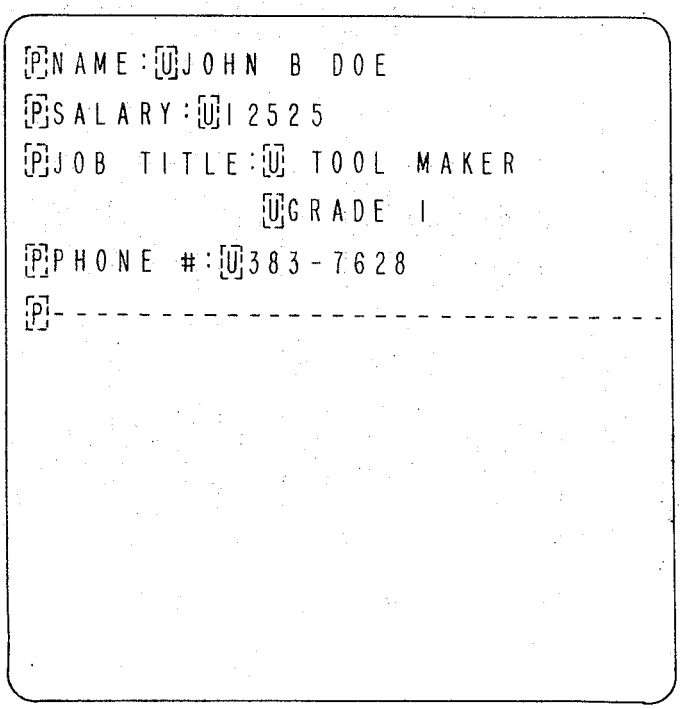
Figure 11:
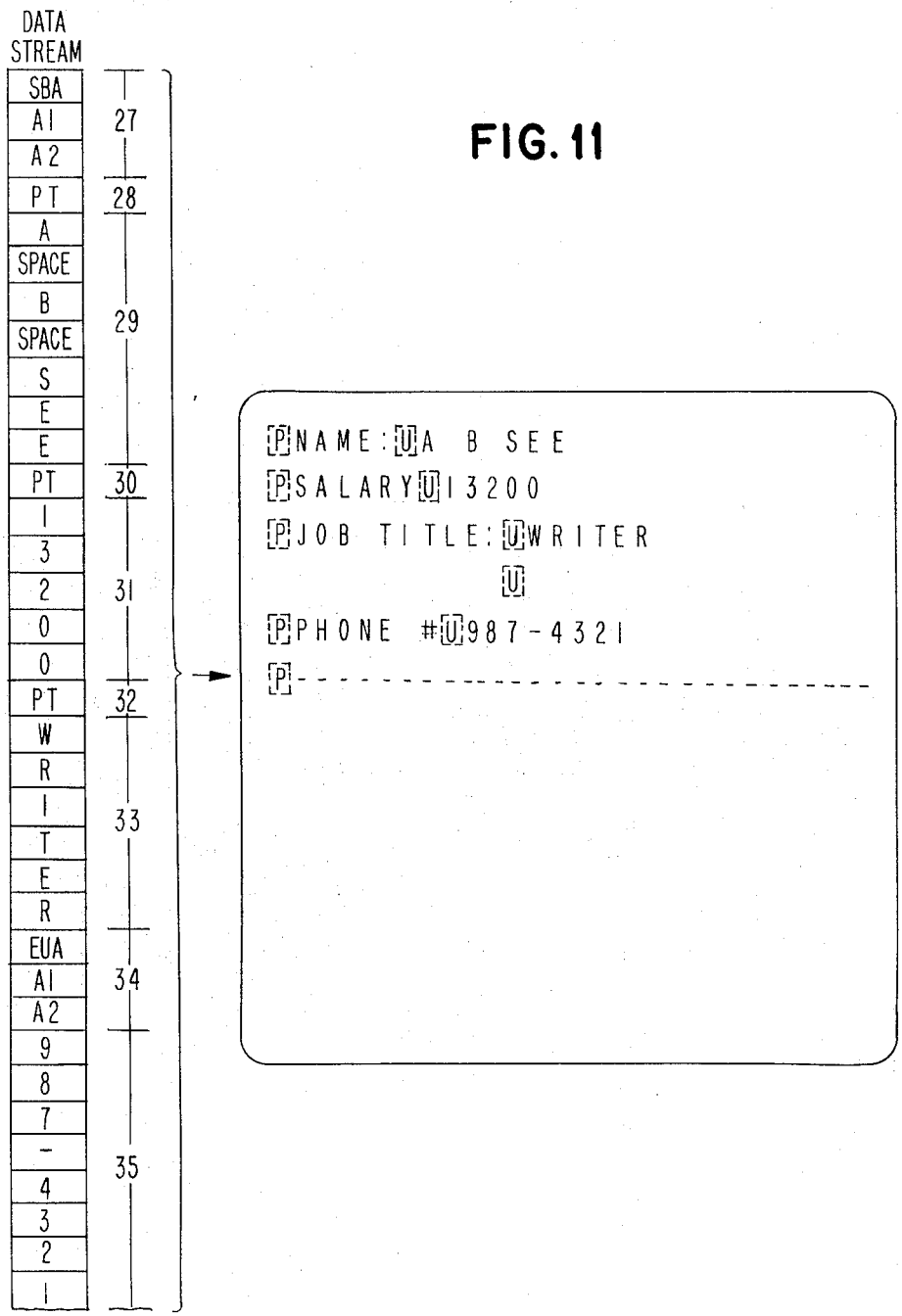

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 30, 1973

915 O.G. 1568

T915,012

COMPUTER OUTPUT DISPLAY

Francis Michael Hartmann, Hurley, Richard Alfred Jones, Redhook, Theodore Edwin Larson, Saugerties, Kenneth Rogers McNary, Hyde Park, and James Theodore Zahorsky, Saugerties, N.Y., assignors to International Business Machines Corporation, Armonk, N.Y.

Filed Nov. 13, 1972, Ser. No. 305,761

**Int. Cl. G06f *3/14***

U.S. Cl. 340—324 AD

8 Sheets Drawing. 21 Pages Specification

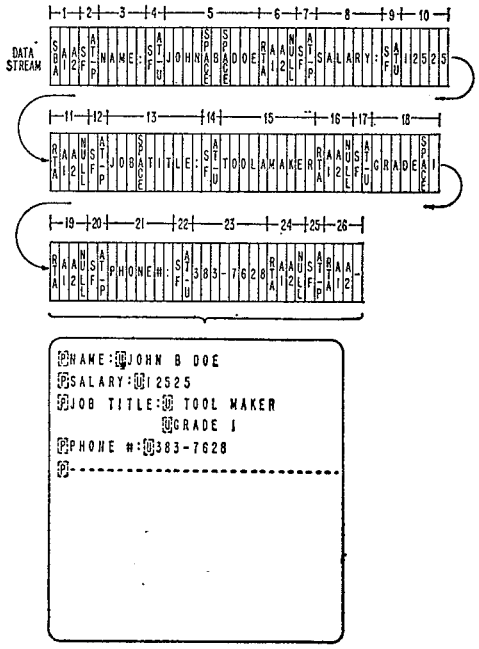

An output display terminal which includes an addressable message buffer for storing characters to be displayed on the screen of the terminal. The terminal responds to a data stream which includes a repeat to address [RTA] buffer control order, a stop address [A1, A2] and a specified alphameric or null character. In executing the order, the specified character is stored in all buffer locations starting at the current buffer address and ending at but not including the specified stop address. With this single order, a specified character may be displayed in successive display positions or a succession of nulls, blanks or spaces may be inserted following the last significant character of a display field.

COMPUTER OUTPUT DISPLAY

Filed Nov. 13, 1972 8 Sheets-Sheet 1

COMPUTER OUTPUT DISPLAY

Filed Nov. 13, 1972 8 Sheets-Sheet 2

COMPUTER OUTPUT DISPLAY

Filed Nov. 13, 1972 8 Sheets-Sheet 4

RTA SEQUENCE

* REPEATED UNTIL ADDRESS EQUAL

COMPUTER OUTPUT DISPLAY

Filed Nov. 13, 1972 8 Sheets-Sheet 7